United States Patent
Craig et al.

(10) Patent No.: US 10,323,636 B2
(45) Date of Patent: Jun. 18, 2019

(54) GEAR PUMP WITH END PLATES OR BEARINGS HAVING SPIRAL GROOVES

(71) Applicant: CIRCOR PUMPS NORTH AMERICA, LLC, Monroe, NC (US)

(72) Inventors: Justin A. Craig, Monroe, NC (US); Joel E. Cate, Indian Trail, NC (US)

(73) Assignee: CIRCOR PUMPS NORTH AMERICA, LLC, Monroe, NC (US)

( * ) Notice: Subject to any disclaimer, the term of this patent is extended or adjusted under 35 U.S.C. 154(b) by 31 days.

(21) Appl. No.: 15/127,584

(22) PCT Filed: Mar. 19, 2015

(86) PCT No.: PCT/US2015/021444
§ 371 (c)(1),
(2) Date: Sep. 20, 2016

(87) PCT Pub. No.: WO2015/143141
PCT Pub. Date: Sep. 24, 2015

(65) Prior Publication Data
US 2017/0175736 A1 Jun. 22, 2017

Related U.S. Application Data

(60) Provisional application No. 61/968,568, filed on Mar. 21, 2014.

(51) Int. Cl.
*F01C 1/08* (2006.01)
*F03C 2/00* (2006.01)
(Continued)

(52) U.S. Cl.
CPC ........ *F04C 15/0042* (2013.01); *F01C 21/108* (2013.01); *F04C 2/086* (2013.01);
(Continued)

(58) Field of Classification Search
CPC .............. F04C 2240/30; F04C 2240/50; F04C 2250/00; F04C 2/14; F04C 15/0042;
(Continued)

(56) References Cited

U.S. PATENT DOCUMENTS 1,486,837 A 3/1924 Ebenezer
4,402,653 A 9/1983 Maruyama et al.
(Continued)

FOREIGN PATENT DOCUMENTS

DE 19744466 A1 4/1999
GB 0883356 A 11/1961
(Continued)

OTHER PUBLICATIONS

Supplementary European Search Report dated Nov. 7, 2017 for European Patent Application No. 15765696.8.
(Continued)

*Primary Examiner* — Theresa Trieu (57) ABSTRACT

A gear pump includes a housing, at least one gear set and a plurality of end plates. The gear set may be positioned between the end plates so that side surfaces of the gears face corresponding side surfaces of the end plates. The side surfaces of the end plates may have a plurality of spiral grooves positioned directly adjacent the side surface of the gears. The plurality of spiral grooves may have a logarithmic shape. Thus arranged, when the gears rotate, fluid in the pump is forced along the lengths of the spiral grooves, creating a local high pressure region that forces fluid between the side surfaces of the gears and the end plates, minimizing or eliminating contact therebetween. In some embodiments the plurality of spiral grooves may be positioned on bearing surfaces of the pump instead of end plates.

24 Claims, 8 Drawing Sheets

(51) Int. Cl.
*F03C 4/00* (2006.01)
*F04C 18/00* (2006.01)
*F04C 15/00* (2006.01)
*F01C 21/10* (2006.01)
*F04C 2/08* (2006.01)
*F04C 2/18* (2006.01)
*F16C 17/04* (2006.01)
*F16C 33/10* (2006.01)
*F04C 2/14* (2006.01)
*F04C 18/14* (2006.01)
*F04C 29/00* (2006.01)

(52) U.S. Cl.
CPC .................. *F04C 2/14* (2013.01); *F04C 2/18* (2013.01); *F04C 15/0088* (2013.01); *F04C 18/14* (2013.01); *F04C 29/0021* (2013.01); *F16C 17/045* (2013.01); *F16C 33/107* (2013.01); *F04C 2240/30* (2013.01); *F04C 2240/50* (2013.01); *F04C 2250/00* (2013.01); *F16C 2360/00* (2013.01)

(58) Field of Classification Search
CPC .... F04C 18/14; F04C 29/0021; F16C 17/045; F16C 33/107; F16C 2360/00
USPC .................. 418/9, 75, 78–80, 131–132, 191, 418/206.1–206.9
See application file for complete search history.

(56) References Cited

U.S. PATENT DOCUMENTS

| | | |
|---|---|---|
| 6,171,089 B1 | 1/2001 | Oehman, Jr. |
| 2006/0024188 A1 | 2/2006 | Muscarella |
| 2013/0216168 A1 | 8/2013 | Konno et al. |
| 2013/0259729 A1 | 10/2013 | Alexander et al. |

FOREIGN PATENT DOCUMENTS

| | | |
|---|---|---|
| JP | 61104178 A | 5/1986 |
| JP | 09280181 A | 10/1997 |
| JP | 2011052644 A | 3/2011 |

OTHER PUBLICATIONS

International Search Report and Written Opinion dated Jun. 26, 2015 for PCT Application, PCT/US2015/021444 filed Mar. 19, 2015.

GEAR PUMP WITH END PLATES OR BEARINGS HAVING SPIRAL GROOVES

FIELD OF THE DISCLOSURE

The disclosure generally relates to bearings for use in pump assemblies, and more particularly to gear pumps having end plates with spiral grooves formed therein.

BACKGROUND OF THE DISCLOSURE

Gear pumps have been employed in a variety of industries and environments. In general, gear pumps include a housing with one or more plates that hold a set of intermeshing gears. As the gears turn, fluid moves between the gear teeth and the housing and is discharged from the pump due to the intermeshing of the gears. The gears are attached to shafts that run axially from the gear faces, and these shafts run on one or more bearing surfaces.

Lubrication of bearing surfaces in gear pumps is often provided by the fluid being conveyed through the pump. One problem with such an arrangement is that upon startup, an adequate lubricating film may not be present (or may not be immediately generated) and thus some bearing surfaces can be subject to wear resulting in damage or premature failure. For example, where an inadequate lubricating film exists between the side faces of the gears and the adjacent end plates, wear related damage to the gears and/or end plates can occur. This problem has previously been addressed by employing hydrodynamic slide bearings with variable depth, and/or through the use of gall-resistant materials aimed at withstanding harsh contact. Surface treatments or coatings of other wear resistant materials have also been applied to the plate surface to resist galling.

Problems with these approaches include difficulty in generating adequate thrust (using the aforementioned slide bearings) without adversely affecting the pumps overall efficiency. In addition, under adverse pumping conditions, gall-resistant materials are still subject to premature failure.

Thus, there is a need for an improved design for reducing wear in gear pumps, particularly in gear and endplate bearing surfaces.

SUMMARY OF THE DISCLOSURE

A gear pump is disclosed. The gear pump may include a housing, a drive gear and a driven gear. The drive gear and the driven gear each may have gear side surfaces. The gear pump may also include first and second end plates having plate side surfaces, the plate side surfaces each including a plurality of spiral grooves disposed opposite the gear side surfaces. The first and second end plates may be disposed on opposite sides of the drive gear and the driven gear. The first and second end plates each may have a central opening for receiving a drive shaft and a first opening for receiving an arbor. The drive gear may be coupled to the drive shaft and the drive gear may rotate the driven gear about the arbor. The plurality of spiral grooves can include a first groove region positioned adjacent the central opening and a second groove region positioned adjacent the first opening. The plurality of spiral grooves of the first groove region may have first ends positioned a first distance from the central opening, thereby forming a circumferential dam around the central opening. The plurality of spiral grooves of the first groove region may have first ends positioned a first distance from the first opening, thereby forming a circumferential dam around the first opening. The plurality of spiral grooves may have a logarithmic shape. The plurality of spiral grooves may be oriented such that rotation of the drive gear and the driven gear generates a low pressure zone in the plurality of spiral grooves adjacent a gear root of the drive gear and the driven gear and generates a high pressure zone in the plurality of spiral grooves adjacent the central opening and the first opening.

An end plate is disclosed for use in a gear pump. The end plate can include a central opening and a first opening for receiving shafts associated with first and second gears of the gear pump. A plurality of spiral grooves can be formed in a side surface of the end plate. The plurality of spiral grooves can include a first groove region positioned adjacent the central opening and a second groove region positioned adjacent the first opening.

A pump is disclosed comprising a housing, a drive gear and a driven gear each having gear side surfaces, and first and second bearings having bearing side surfaces. The bearing side surfaces each may include a plurality of spiral grooves disposed opposite the gear side surfaces. A bearing is disclosed for use in a gear pump. The bearing may include a central opening and a first opening for receiving shafts associated with first and second gears of the gear pump. A plurality of spiral grooves may be formed in a side surface of the bearing. The plurality of spiral grooves can include a first groove region positioned adjacent the central opening and a second groove region positioned adjacent the first opening.

BRIEF DESCRIPTION OF THE DRAWINGS

By way of example, a specific embodiment of the disclosed device will now be described, with reference to the accompanying drawings.

DETAILED DESCRIPTION

A gear pump is disclosed having features configured to reduce wear of bearing surfaces during pump startup and to provide efficient performance in operation. In one embodiment, spiral grooves are provided in the end-plates adjacent to the faces of the pump gears. These grooves can be oriented in an inward-pumping orientation in order to generate a high pressure zone between the opposing faces and ensure separation between the gear and plate.

Figure 1:
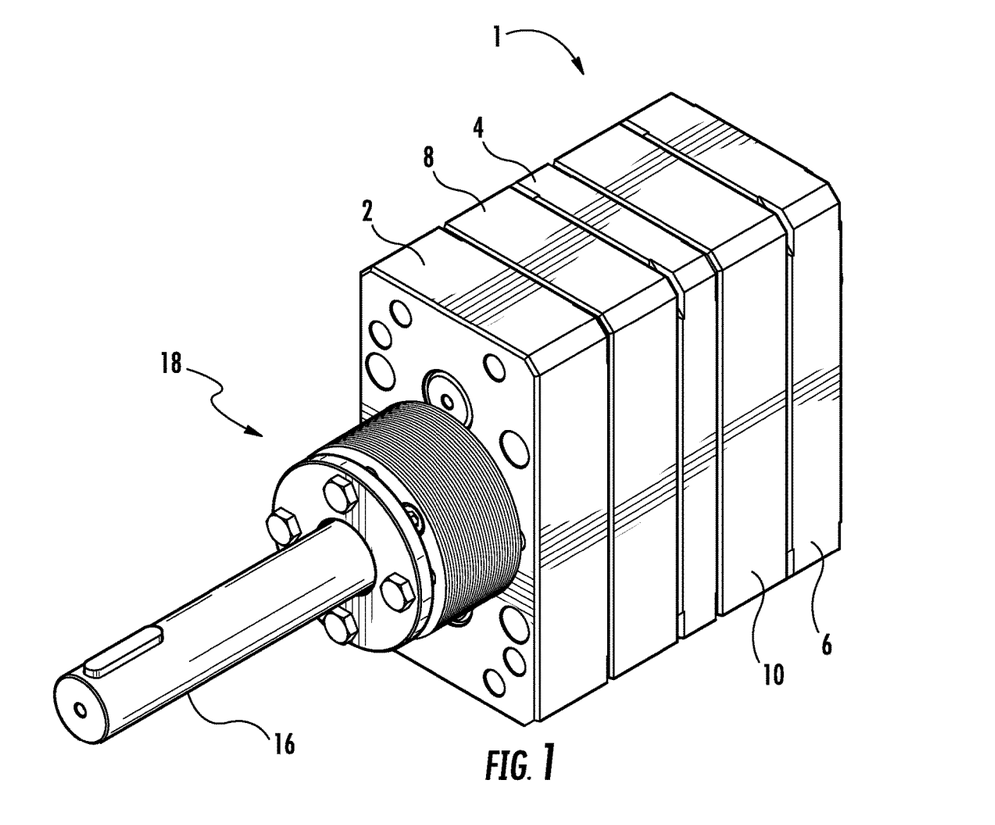
FIG. 1 is a perspective view of a pump including the disclosed spiral grooves in a plurality of end plates.
Figure 2:
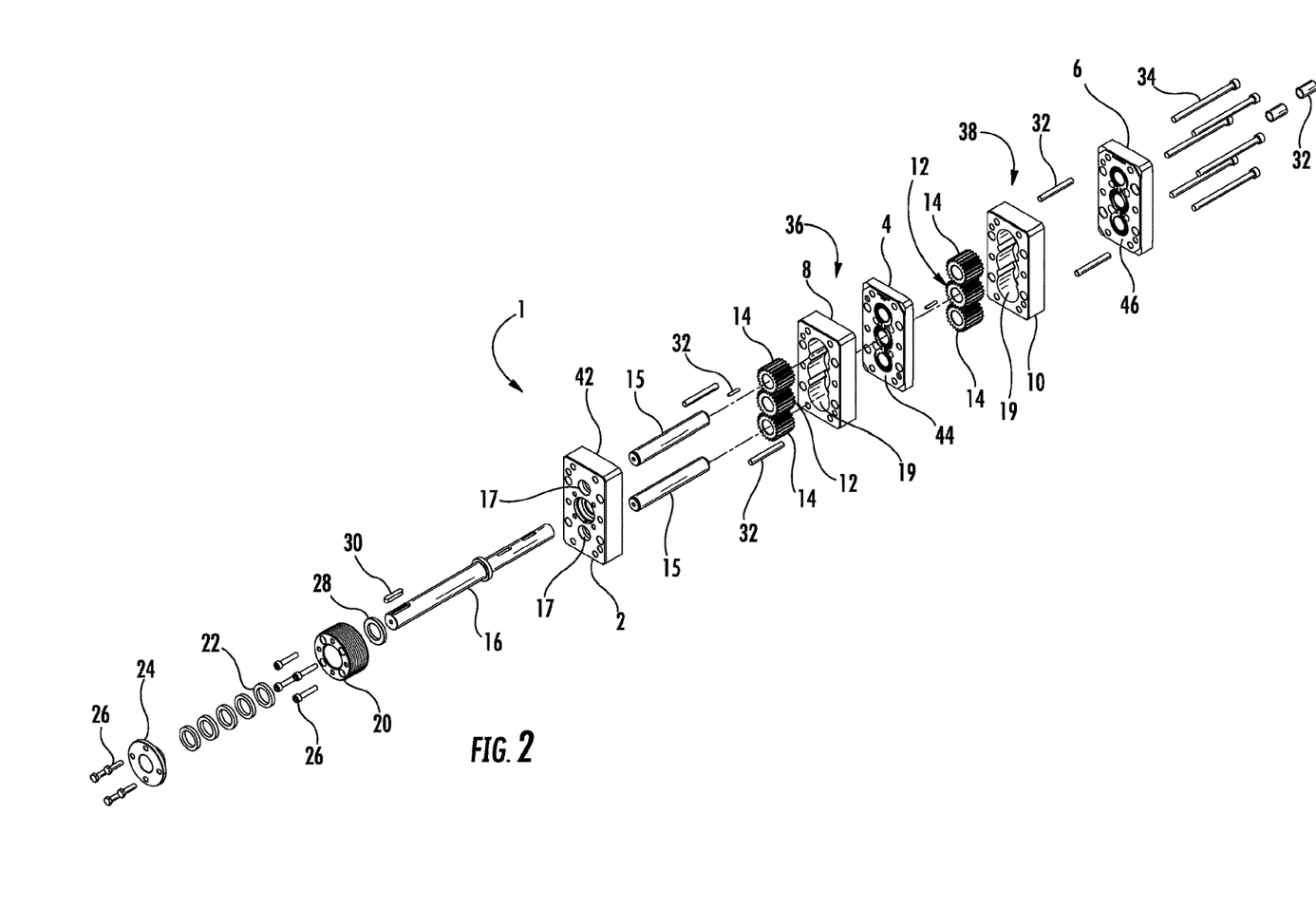
FIG. 2 is an exploded view of the pump of FIG. 1.
Figure 3:
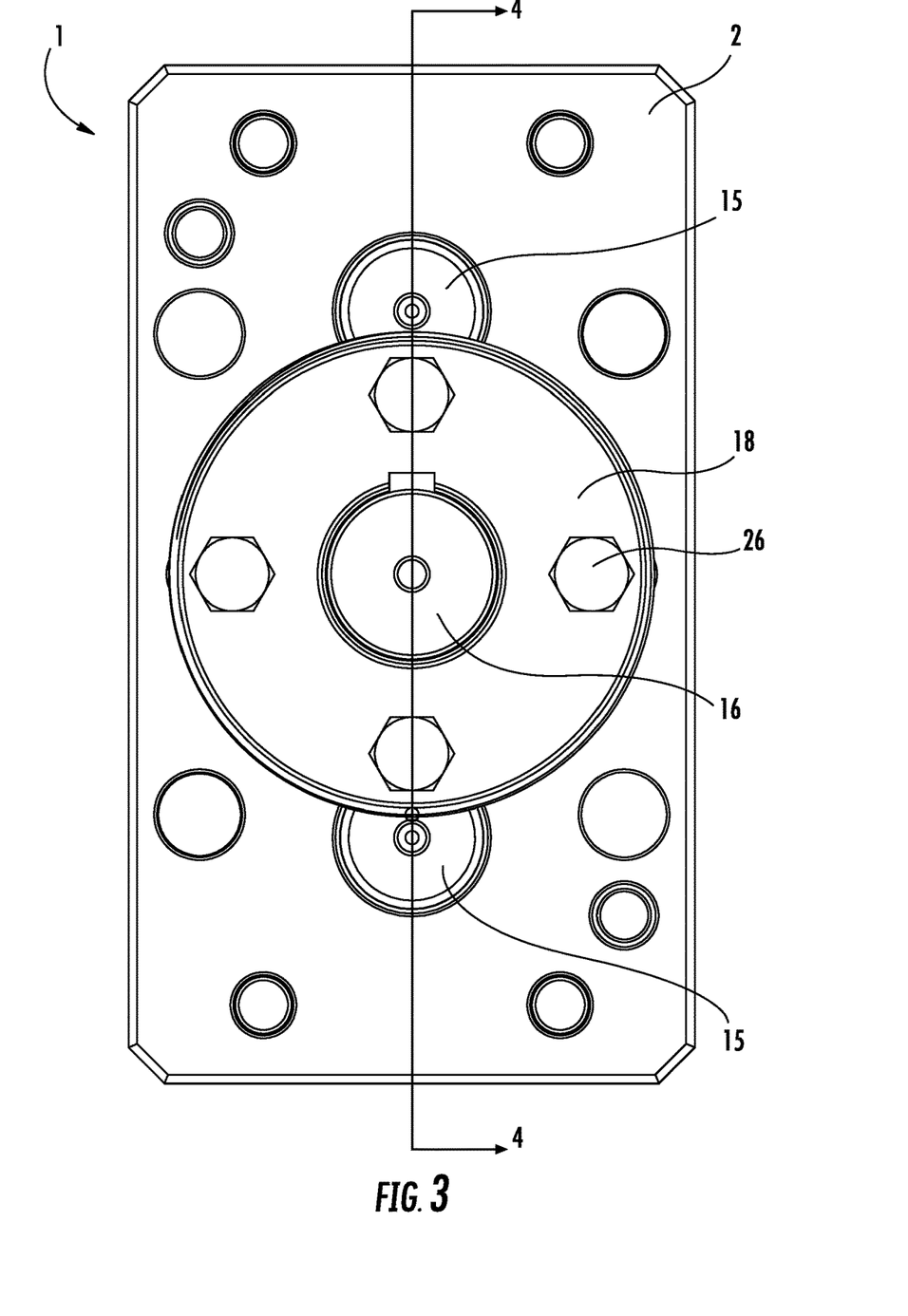
FIG. 3 is an end view of the pump of FIG. 1.

FIGS. 1-3 show an exemplary gear pump 1 having first, second and third end plates 2, 4, 6, first and second gear plates 8, 10, a plurality of intermeshing gears 12, 14, and a drive shaft 16. The gear pump 1 also includes a packing assembly 18 including a packing housing 20, a plurality of packing rings 22, a packing gland 24, a plurality of fasteners 26 and a thrust washer 28 seals against the first end plate 2 to prevent fluid leakage past the drive shaft 16. A key 30 may be set into the drive shaft 16 to couple the drive shaft to a motor (not shown). The drive shaft 16 may be coupled to the drive gears 12, while the driven gears 14 may be coupled to associated arbors 15 which themselves are rotatably supported in openings 17 in the first end plate 2. The drive gears 12 and driven gears 14 may be received within openings 19 in the first and second gear plates 8, 10.

Inlet and outlet ports (not shown) may be formed in one or more of the end plates 2, 4, 6 for moving fluid through the pump 1. These ports may be coupled to appropriate inlet and outlet piping or tubing (not shown) via an O-ring or other appropriate connection. The first, second and third end plates 2, 4, 6 and the first and second gear plates 8, 10, may be aligned using a series of dowels 32 positioned in associated openings in the respective plates, and the plates may be fixed in its assembled form via a plurality of fasteners 34, which in the illustrated embodiment are socket head cap screws.

FIG. 2 shows the pump 1 in exploded form. As can be seen, the drive shaft 16 couples to first and second driving gears 12, which in the illustrated embodiment are the center gears of two three-gear stages 36, 38. The first and second driving gears 12 intermesh with respective second and third driven gears 14 to power each of the three-gear stages. FIG. 3 is an end view of the pump 1 showing the drive shaft 16, packing assembly 18 and end plate 2.

Figure 4:
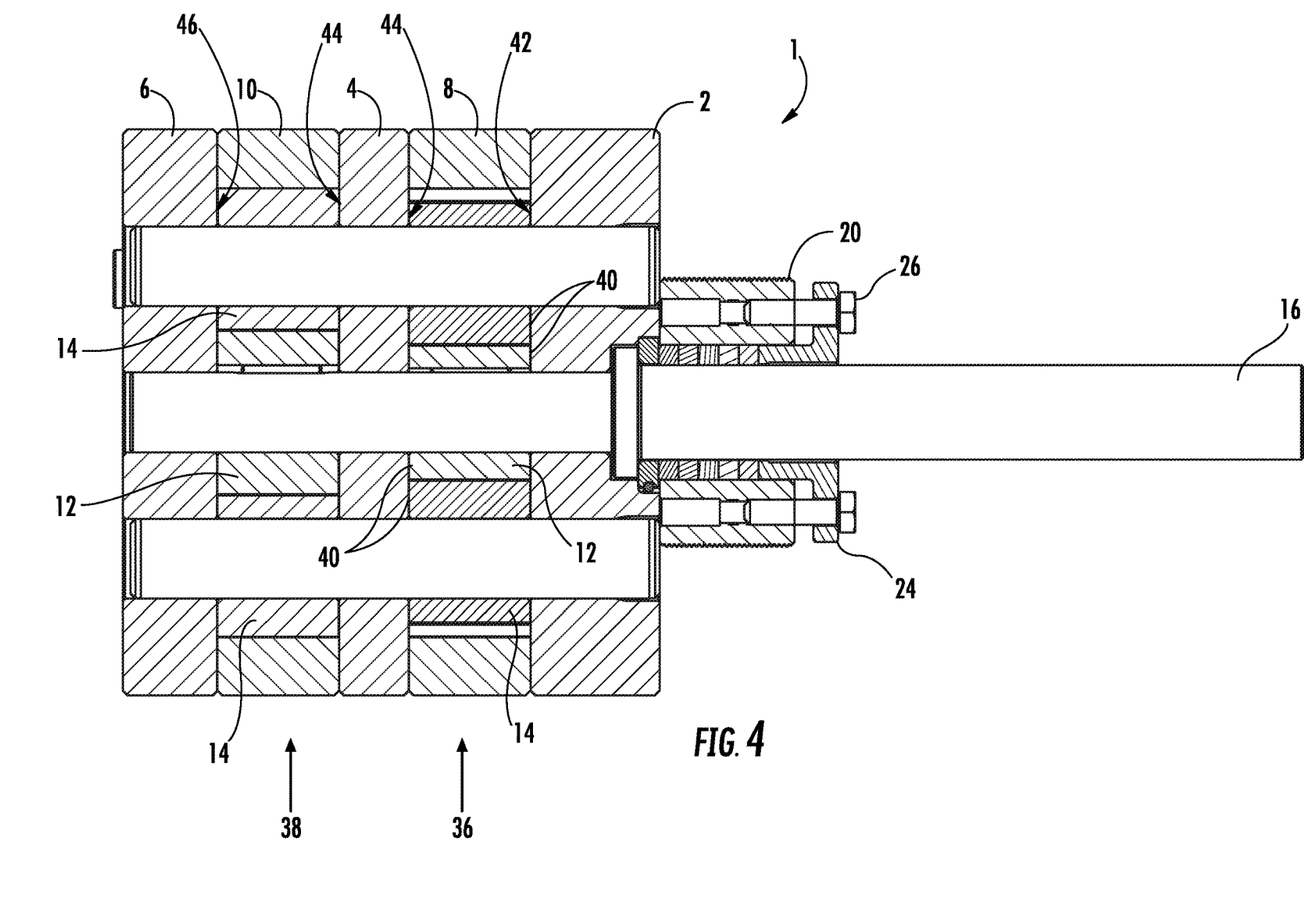
FIG. 4 is a cross-section view of the pump of FIG. 1, taken along line 4-4 of FIG. 3.

FIG. 4 shows the internal inter-relation of components of the pump 1 when assembled. As can be seen, the first and third end plates 2, 6 sandwich the first and second gear plates 8, 10 and the second end plate 4 therebetween, along with the driving and driven gears 12, 14 of the first and second three-gear stages 36, 38.

As can be seen, the drive gears 12 and driven gears 14 are positioned directly adjacent to the first, second and third end plates 2, 4, 6 such that side faces 40 of the drive gears 12 and the driven gears 14 can contact opposing side surfaces 42, 44, 46 of the first, second and third end plates, respectively. It will be appreciated that gaps can exist between the side faces 40 of the gears and the opposing side surfaces 42, 44, 46 of the end plates. As such, a quantity of the pumped fluid can be drawn into these gaps during operation of the pump 1 to lubricate the surfaces and to prevent or minimize direct contact between the surfaces.

Figure 5:
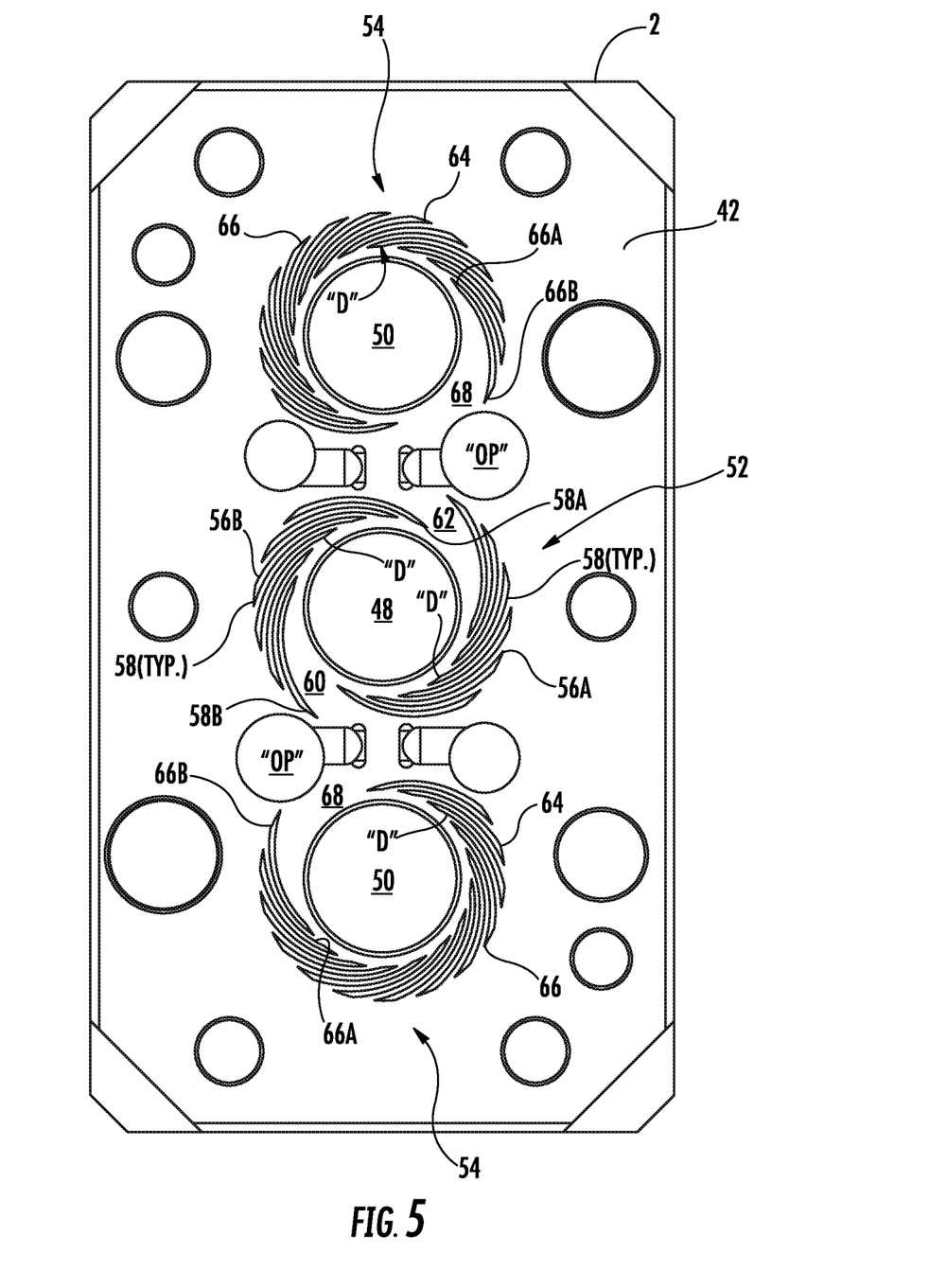
FIG. 5 is a side view of an exemplary end plate for use in the pump of FIG. 1.

Referring to FIG. 5, the first end plate 2 is shown. Although this description will proceed with relation to the first end plate 2 it will be appreciated that the description will apply equally to the second and third end plates 4, 6. The side surface 42 of the first end plate 2 may be a substantially planar surface having a central opening 48 for receiving the drive shaft 16, and first and second oppositely disposed openings 50 for receiving the arbor 15 therethrough. A first groove region 52 may be disposed in the side surface 42 adjacent the central opening 48, while a pair of second groove regions 54 may be disposed in the side surface adjacent the first and second openings 50.

The first groove region 52 may comprise first and second sets of spiral grooves 56A, B formed in the side surface 42 of the first end plate 2. Each of the first and second sets of spiral grooves 56A, B may include a plurality of individual spiral grooves 58 having first ends 58A positioned a first distance "D" from the central opening 48, and second ends 58B fanning out in a direction away from the central opening. The first and second sets of spiral grooves 56A, B may be disposed on opposite sides of the central opening 48 such that first and second non-grooved regions 60, 62 are formed adjacent the central opening 48. These non-grooved regions 60, 62 are positioned adjacent to the outlet ports "OP" of the first end plate 2. These non-grooved regions 60, 62 can be positioned to avoid creating a flow path between high and low pressure sides of the meshing gears.

Figure 6:
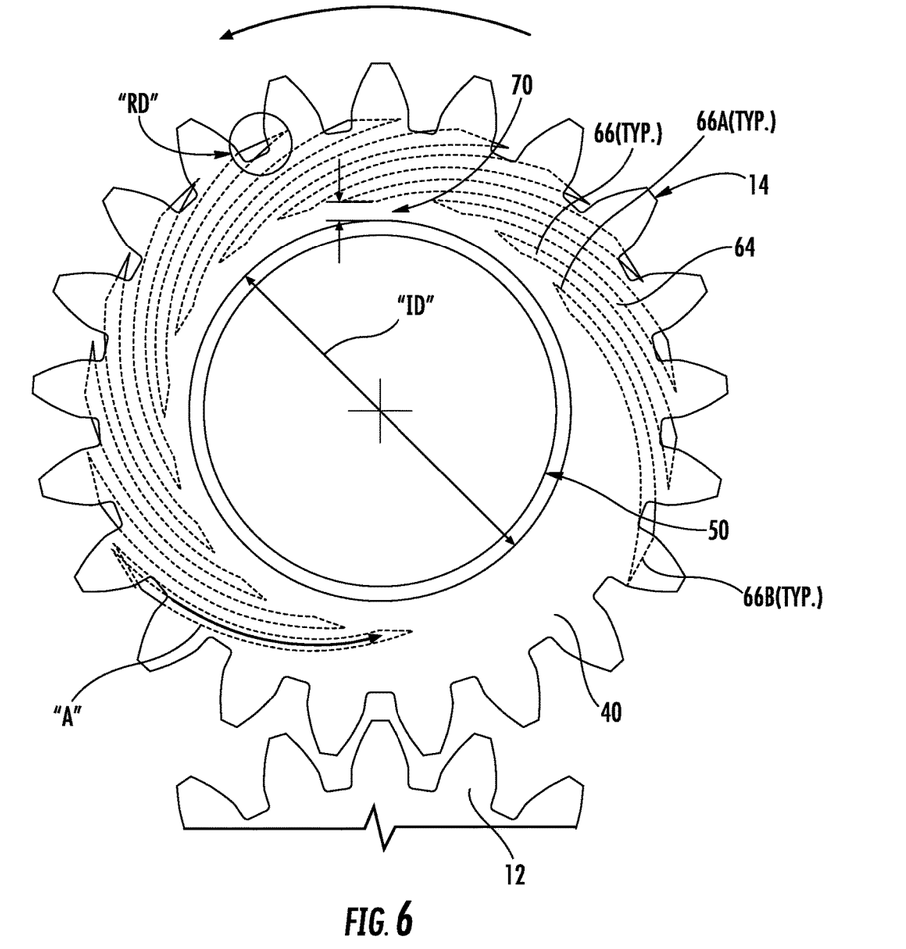
FIG. 6 is a schematic view of the position of the spiral grooves of the end plate of FIG. 5 adjacent an exemplary gear of the pump of FIG. 1.

The second groove region 54 associated with each of the first and second openings 50 may each include a single set of spiral grooves 64 formed in the side surface 42 of the first end plate 2. The single set of spiral grooves 64 may include a plurality of individual spiral grooves 66 having first ends 66A positioned a first distance "D" from the respective first and second opening 50, and second ends 66B fanning out in a direction away from the opening. The single set of spiral grooves 64 may be arranged such that a non-grooved region 68 is formed adjacent each of the first and second openings. The non-grooved region 68 may be positioned adjacent to the outlet ports "OP" of the first end plate 2. The non-grooved region 68 can be positioned to avoid creating a flow path between high and low pressure sides of the meshing gears In some embodiments the spiral grooves 58, 66 may have the shape of a logarithmic curve, and may be disposed in the surface of the end-plates 2, 4, 6 adjacent to the running faces 40 of the gears 12, 14. As can be seen in FIG. 6, which shows an exemplary view illustrating the disclosed spiral grooves 66 in the context of an exemplary gear 14, the second ends 66B of the spiral grooves 66 begin immediately beyond the root diameter "RD" of the gear and terminate at the first ends 66A at a diameter that is larger than the ID of the opening 50 in the end-plate 2 leaving a specified dam region 70 that runs the circumference of the opening. The rotation of the gear 14 in relation to the grooves 66 drives the fluid along the length of the groove 66 in the direction of arrow "A" (i.e., from the second end 66B to the first end 66A) until it reaches the dam region 70. This generates a low pressure zone in the grooves 66 at the gear root (adjacent the second ends 66B of the grooves 66) and a high pressure zone located at the termination (i.e., the first ends 66A) of the grooves 66. This high pressure causes an increase in the fluid film thickness between the gear 14 and end-plate 2, and imparts an axial force between the gear and end plate, eliminating contact.

In some embodiments the grooves 66 are formed by a laser etching process, and have a uniform depth along their length. It will be appreciated that other techniques may be used to form the grooves. In addition, it is contemplated that in some instances the grooves may not be of uniform depth along their lengths.

In some embodiments, the groove-to-dam ratio is optimized for high load-carrying capacity or minimum take-off velocity (i.e., the speed at which separation between the gears and the end plate occurs). Groove depth may also be optimized for high load-carrying capacity. The grooves may have a depth of less than about 30 micrometers to optimize load carrying capacity and to minimize wear. In addition, if kept shallow the grooves may be used as wear indicators. That is, if the grooves begin to disappear such a condition can be observed during routine maintenance and/or cleaning.

In some embodiments a width of the grooves adjacent to the root diameter "RD" of the associated gear 12, 14 may not exceed a width of the gear tooth at the root diameter. It will be appreciated that if the groove were wider than the gear tooth the groove could connect two fluid pockets, thus reducing the pressure differential between the volumes and adversely affecting the overall pressure building capability of the pump.

In some embodiments groove spiral shape may be obtained using the formula:

$$r = r_1 e^{\varphi \tan(\alpha)}$$

Where r and φ are polar coordinates, $r_1$ is the radius at termination (i.e., at the first ends 58A, 66A of the grooves 58, 66) and α is the angle between the tangent line at any point on the log curve and the moving direction at that same point.

As previously noted, although a single set of grooves 66 have been described in relation to the first end plate 2, it will be appreciated that the same description can apply equally to the remaining groove sets and the second and third end plates 4, 6. It will also be appreciated that the second end plate 4 will have groove sets on both sides of the end plate to interact with the first and second gear sets 36, 38.

As such, the driving and driven gears 12, 14 of each of the first and second gear sets 36 will oppose groove sets on both sides of the gears, providing a self-centering feature for the gears which centering thrust is applied to either side of the gears. This equal and opposite thrust load can serve to center the gears between their associated end plates. Thus, the disclosed arrangement provides a benefit during startup and well as operation.

Figure 7:
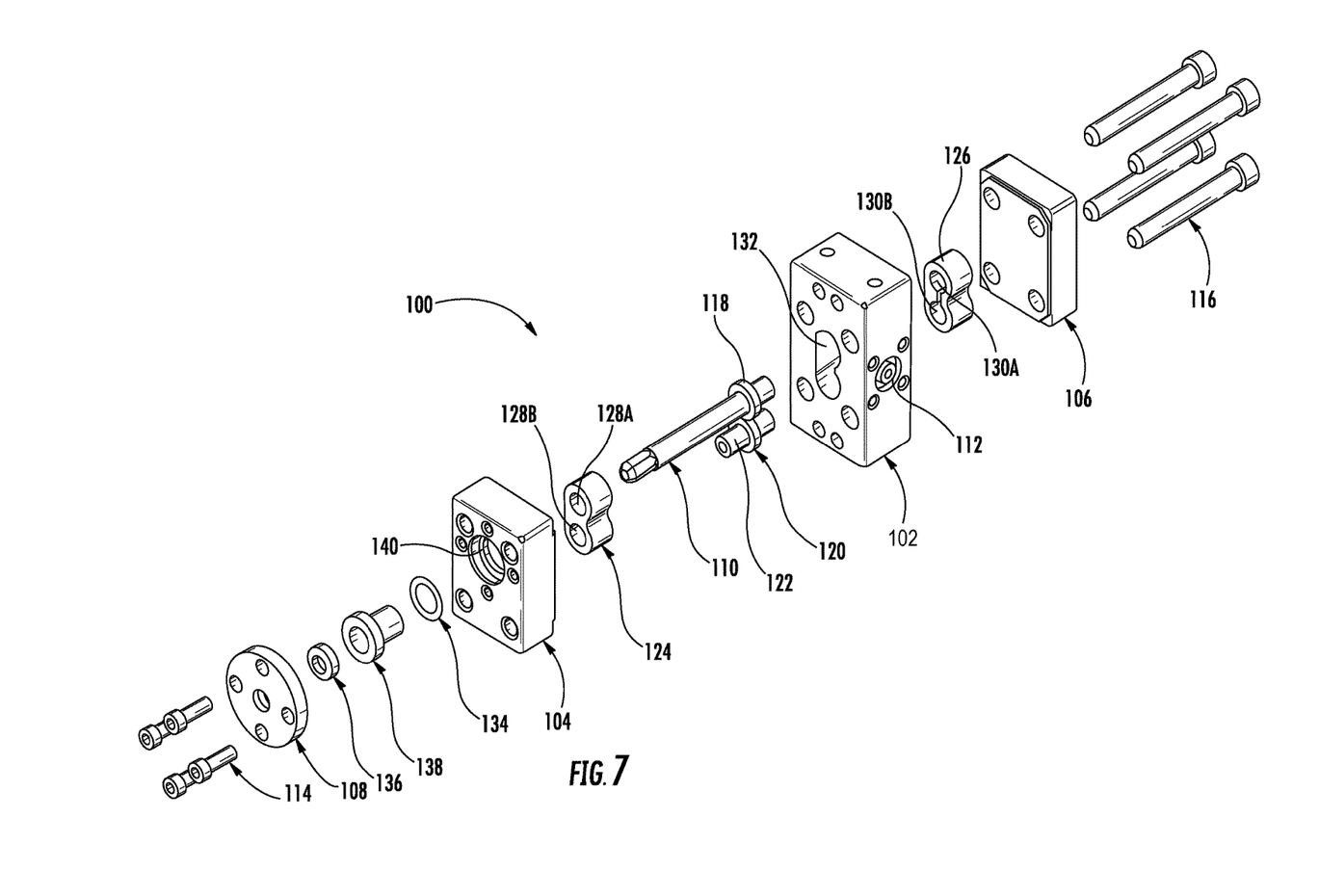
FIG. 7 is an exploded view of a pump including the disclosed spiral grooves in first and second bearings.
Figure 8:
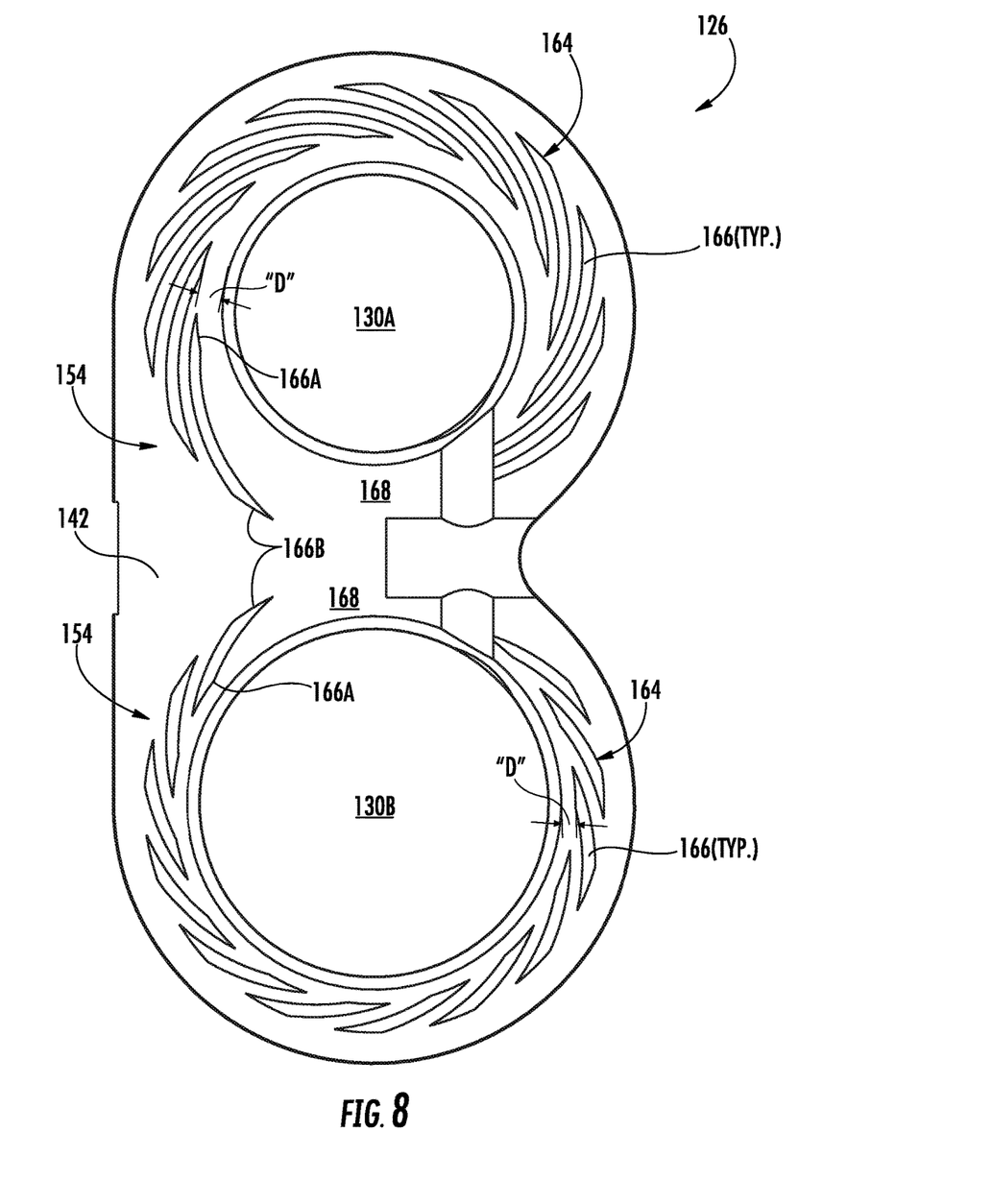
FIG. 8 is a side view of an exemplary bearing for use in the pump of FIG. 7.

Referring now to FIGS. 7 and 8, an alternative gear pump 100 is shown. The gear pump 100 may include a central gear plate 102, front and rear plates 104, 106, a seal plate 108 and a drive shaft 110. An inlet port (not shown) and an outlet port 112 may be formed in the central gear plate for moving fluid through the pump 100. The inlet and outlet ports may be coupled to inlet and outlet piping or tubing via an o-ring connection. The pump 1 may be fixed in its assembled form via a plurality of fasteners, which in the illustrated embodiment are socket head cap screws 114, 116.

The drive shaft 110 includes a first gear 118 which intermeshes with a second gear 120 of a driven shaft 122. First and second asymmetrical bearings 124, 126 are positioned on opposite sides of the first and second gears 118, 120 and receive the drive shaft 110 and driven shaft 122 via respective bores 128A, B, 130A, B. The first and second gears 118, 120 and first and second asymmetrical bearings 124, 126 are received within an asymmetrical opening 132 in the central gear plate 102. In the illustrated embodiment, the asymmetrical opening 132 is shaped to correspond to the shape of the asymmetrical bearings 124, 126, which facilitates installation of the bearings and maintains their alignment during operation.

The seal plate 108 may fix a variety of sealing elements to the front plate 104 to prevent fluid leakage around the drive shaft 110. The sealing elements may include an o-ring 134, a lip seal 136 and a sealing sleeve 138, all of which may be received in a suitably configured recess 140 in the front plate 104.

FIG. 8 shows the second asymmetrical bearing 126. Although this description will proceed with relation to the second asymmetrical bearing 126 it will be appreciated that the description will apply equally to the first asymmetrical bearing 124. The side surface 142 of the second asymmetrical bearing 126 may have a substantially planar surface with bores 130A and 130B. The side surface 142 will face the drive gear 118 and the driven gear 120 when the pump 100 is assembled. A groove regions 154 may be disposed in the side surface 142 adjacent the bores 130A, 130B. The groove regions 154 may each include a set of spiral grooves 164 formed in the side surface 142 of the second asymmetrical bearing 126. The set of spiral grooves 164 may include a plurality of individual spiral grooves 166 having first ends 166A positioned a first distance "D" from the respective bores 130A, 130B, and second ends 166B fanning out in a direction away from the bores. The set of spiral grooves 164 may be arranged such that a non-grooved region 168 is formed adjacent each of the bores. The non-grooved region 168 may be positioned to avoid creating a flow path between high and low pressure sides of the meshing gears 118, 122.

In some embodiments the spiral grooves 166 may have the shape of a logarithmic curve, and may be disposed in the surface of the asymmetrical bearings 124, 126 adjacent to the running faces of the gears 118, 120. Thus, the grooves and groove arrangement of the embodiment of FIGS. 7 and 8 can have any or all of the physical and/or operational features previously described in relation to the grooves of the embodiment of FIGS. 5 and 6.

In some embodiments the spiral grooves can be provided on the side faces 40 of the drive and/or driven gears 12, 14 in lieu of the first, second and third end plates 2, 4, 6 or the first and second asymmetrical bearings 124, 126. Such spiral grooves can have some or all of the features previously described in relation to FIGS. 5 and 6.

In applications with very poor pump efficiencies, the grooves can be inverted to create and outward-pumping arrangement and reduce slip across the side faces of the gear, while still generating the required pressure zone.

In pumps that are subject to significant axial load in one direction, the disclosed arrangement can be applied to only one plate in order to generate a counteracting axial force.

The disclosed arrangement can be incorporated into pumps that will have applications with high rates of gear face galling or low lubricity applications that impart high wear on the gear faces. This disclosed arrangement can also be utilized in low viscosity applications, making use of the side clearance equalization to reduce side clearance slip and therefore improve overall efficiency. The disclosed arrangement can also be used in applications having start-up face failure issues.

This disclosed spiral groove arrangement can be installed after all other manufacturing processes are completed, thus enabling better control of groove location and depth. As noted, this precise and symmetric spiral groove feature positioned adjacent to opposed gear face can create a desirable centering balance of forces. The presence of the disclosed fluid dam can ensure minimal negative impact on pumping efficiency. The disclosed arrangement can generate separation force in addition to acting as a fluid reservoir. The extension of the spiral groove feature beyond the root diameter of the gear can allow for more efficient filling of the groove and better pressure generation. At a threshold speed, the thrust load can cause the gear to run with more equal side clearances. The disclosed arrangement thus eliminates the need for exotic materials, coatings, or surface treatments to prevent wear.

The disclosed arrangement provides a less costly manufacturing solution, and is also more easily controlled as compared to pre-heat treatment processes or hard ground features as have been used previously. The disclosed arrangement can also improve pump efficiency, due to equalized side clearances between the gear side faces and the associated end plates. Equalized side clearances can also reduce asymmetrical wear of the pump end plates or bearing surfaces. The inward-pumping action caused by the spiral grooves can generate higher load-bearing capability as compared to other thrust generating designs such as sliding bearings.

Based on the foregoing information, it will be readily understood by those persons skilled in the art that the disclosed arrangement is susceptible of broad utility and application. Many embodiments and adaptations of the disclosed arrangement other than those specifically described herein, as well as many variations, modifications, and equivalent arrangements, will be apparent from or reasonably suggested by the disclosed arrangement and the foregoing descriptions thereof, without departing from the substance or scope of the disclosure. Accordingly, while the disclosed arrangement has been described herein in detail in relation to its preferred embodiment, it is to be understood that this disclosure is only illustrative and exemplary and is made merely for the purpose of providing a full and enabling disclosure. The foregoing disclosure is not intended to be construed to limit or otherwise exclude any such other embodiments, adaptations, variations, modifications or equivalent arrangements; the disclosure being limited only by the claims appended hereto and the equivalents thereof. Although specific terms are employed herein, they are used in a generic and descriptive sense only and not for the purpose of limitation.

What is claimed is:

1. A gear pump, comprising:
a housing;
a drive gear and a driven gear, the drive gear and the driven gear each having gear side surfaces; and
first and second end plates having plate side surfaces, the plate side surfaces each including a plurality of spiral grooves disposed opposite the gear side surfaces;
wherein the plurality of spiral grooves are oriented such that rotation of the drive gear and the driven gear generates a low pressure zone in the plurality of spiral grooves adjacent a gear root of the drive gear and a gear root of the driven gear and generates a high pressure zone in the plurality of spiral grooves adjacent a central opening and a first opening.

2. The gear pump of claim 1, wherein a drive shaft is receivable in the central opening, and an arbor is receivable in the first opening, the drive gear coupled to the drive shaft and the driven gear engaged with the drive gear to rotate the driven gear about the arbor, wherein the plurality of spiral grooves includes a first groove region positioned adjacent the central opening and a second groove region positioned adjacent the first opening.

3. The gear pump of claim 2, wherein the plurality of spiral grooves of the first groove region have first ends positioned a first distance from the central opening, thereby forming a circumferential dam around the central opening.

4. The gear pump of claim 2, wherein the plurality of spiral grooves of the second groove region have first ends positioned a first distance from the first opening, thereby forming a circumferential dam around the first opening.

5. The gear pump of claim 2, the first groove region including first and second sets of spiral grooves, each of the first and second sets of spiral grooves including a plurality of individual spiral grooves, the first and second sets of spiral grooves disposed on opposite sides of the central opening such that first and second non-grooved regions are formed adjacent the central opening, the first and second non-grooved regions being positioned adjacent to first and second outlet ports of the first end plate, the first and second non-grooved regions positioned to prevent a flow path between high and low pressure sides of the drive gear and the driven gear.

6. The gear pump of claim 1, wherein the plurality of spiral grooves have a shape of a logarithmic curve.

7. The gear pump of claim 1, wherein at least one non-grooved region is disposed adjacent the plurality of spiral grooves, the plurality of spiral grooves and the at least one non-grooved regions being adjacent to an opening of each of the first and second end plates; and
wherein the at least one non-grooved region is positionable to prevent a flow path between high and low pressure sides of the drive gear and the driven gear.

8. An end plate for use in a gear pump, the end plate comprising:
a central opening and a first opening for receiving shafts associated with first and second gears of the gear pump; and
a plurality of spiral grooves formed in a side surface of the end plate;
wherein the plurality of spiral grooves includes a first groove region positioned adjacent the central opening and a second groove region positioned adjacent the first opening; and
wherein the plurality of spiral grooves are oriented such that rotation of a drive gear and a driven gear generates a low pressure zone in the plurality of spiral grooves adjacent a gear root of the drive gear and a gear root of the driven gear and generates a high pressure zone in the plurality of spiral grooves adjacent the central opening and the first opening.

9. The end plate of claim 8, wherein the plurality of spiral grooves of the first groove region have first ends positioned a first distance from the central opening, thereby forming a circumferential dam around the central opening.

10. The end plate of claim 9, wherein the plurality of spiral grooves of the second groove region have first ends positioned a first distance from the first opening, thereby forming a circumferential dam around the first opening.

11. The end plate of claim 8, wherein the plurality of spiral grooves have a shape of a logarithmic curve.

12. The end plate of claim 8, wherein at least one non-grooved region is disposed adjacent the first and second groove regions adjacent to the central opening and the first opening; and
wherein the at least one non-grooved region is positionable to prevent a flow path between high and low pressure sides of the drive gear and the driven gear.

13. A gear pump, comprising:
a housing;
a drive gear and a driven gear, the drive gear and the driven gear each having gear side surfaces; and
first and second bearings having bearing side surfaces, the bearing side surfaces each including a plurality of spiral grooves disposed opposite the gear side surfaces;
wherein the plurality of spiral grooves are oriented such that rotation of the drive gear and the driven gear generates a low pressure zone in the plurality of spiral grooves adjacent a gear root of the drive gear and a gear root of the driven gear and generates a high pressure zone in the plurality of spiral grooves adjacent a central opening and a first opening.

14. The pump of claim 13, wherein a drive shaft is receivable in the central opening, and an arbor is receivable in the first opening, the drive gear coupled to the drive shaft and the driven gear engaged with the drive gear to rotate the driven gear about the arbor, wherein the plurality of spiral grooves includes a first groove region positioned adjacent the central opening and a second groove region positioned adjacent the first opening.

15. The gear pump of claim 14, wherein the first groove region comprises first and second sets of spiral grooves, each of the first and second sets of spiral grooves including a plurality of individual spiral grooves, the first and second sets of spiral grooves disposed on opposite sides of the central opening such that first and second non-grooved regions are formed adjacent the central opening, the first and second non-grooved regions positioned adjacent to first and second outlet ports of a central gear plate, the first and second non-grooved regions positioned to prevent a flow path between high and low pressure sides of the drive gear and the driven gear.

16. The pump of claim 14, wherein the plurality of spiral grooves of the first groove region have first ends positioned a first distance from the central opening, thereby forming a circumferential dam around the central opening.

17. The pump of claim 14, wherein the plurality of spiral grooves of the second groove region have first ends positioned a first distance from the first opening, thereby forming a circumferential dam around the first opening.

18. The pump of claim 13, wherein the plurality of spiral grooves have a shape of a logarithmic curve.

19. The pump claim 13, wherein at least one non-grooved region is disposed adjacent the plurality of spiral grooves, the plurality of spiral grooves and the at least one non-grooved regions being adjacent to an opening of the bearing; and wherein the at least one non-grooved region is positionable to prevent a flow path between high and low pressure sides of the drive gear and the driven gear.

20. A bearing for use in a gear pump, the bearing comprising:

a central opening and a first opening for receiving shafts associated with first and second gears of the gear pump; and a plurality of spiral grooves formed in a side surface of the bearing;

wherein the plurality of spiral grooves includes a first groove region positioned adjacent the central opening and a second groove region positioned adjacent the first opening; and wherein the plurality of spiral grooves are oriented such that rotation of a drive gear and a driven gear generates a low pressure zone in the plurality of spiral grooves adjacent a gear root of the drive gear and a gear root of the driven gear and generates a high pressure zone in the plurality of spiral grooves adjacent the central opening and the first opening.

21. The bearing of claim 20, wherein the plurality of spiral grooves of the first groove region have first ends positioned a first distance from the central opening, thereby forming a circumferential dam around the central opening.

22. The bearing of claim 21, wherein the plurality of spiral grooves of the second groove region have first ends positioned a first distance from the first opening, thereby forming a circumferential dam around the first opening.

23. The bearing of claim 20, wherein the plurality of spiral grooves have a shape of a logarithmic curve.

24. The bearing of claim 20, wherein at least one non-grooved region is disposed adjacent the first and second groove regions adjacent to the central opening and the first opening; and wherein the at least one non-grooved region is positionable to prevent a flow path between high and low pressure sides of the drive gear and the driven gear.

* * * * *